A. C. McWILLIAMS.
WASHING MACHINE.
APPLICATION FILED MAY 27, 1912.
1,121,275.
Patented Dec. 15, 1914.
2 SHEETS—SHEET 2.
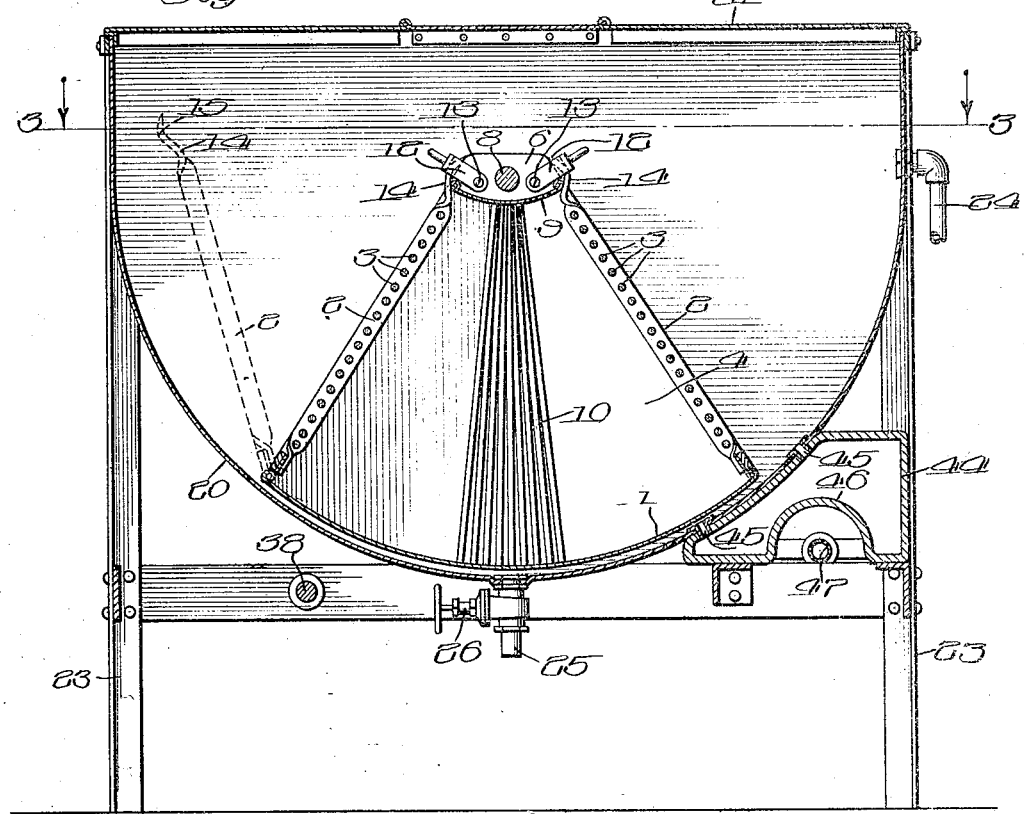
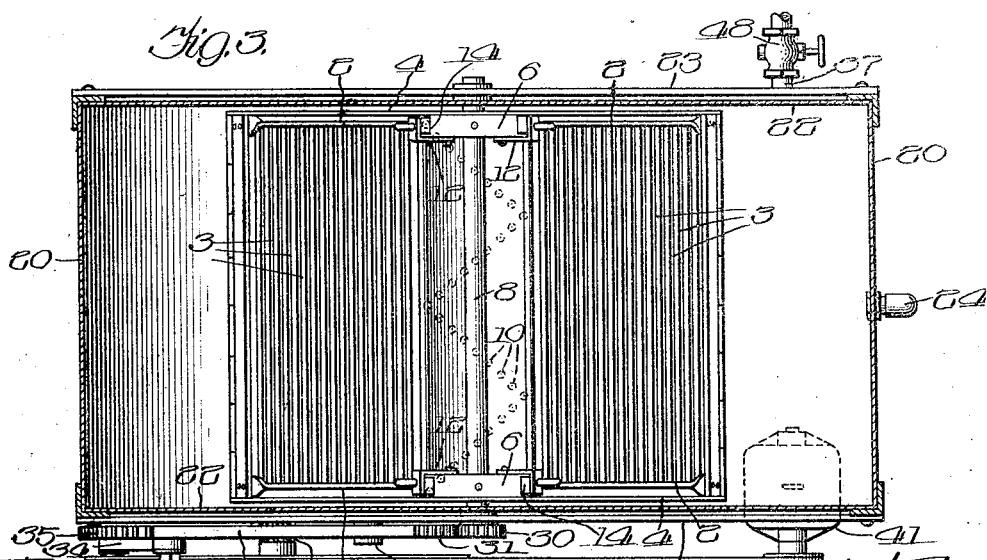
Witnesses:
Jno. H. Nelson Jr.
Edwin B. Nelson
Inventor:
Arthur C. McWilliams.
By Cheever & Cox Attys.

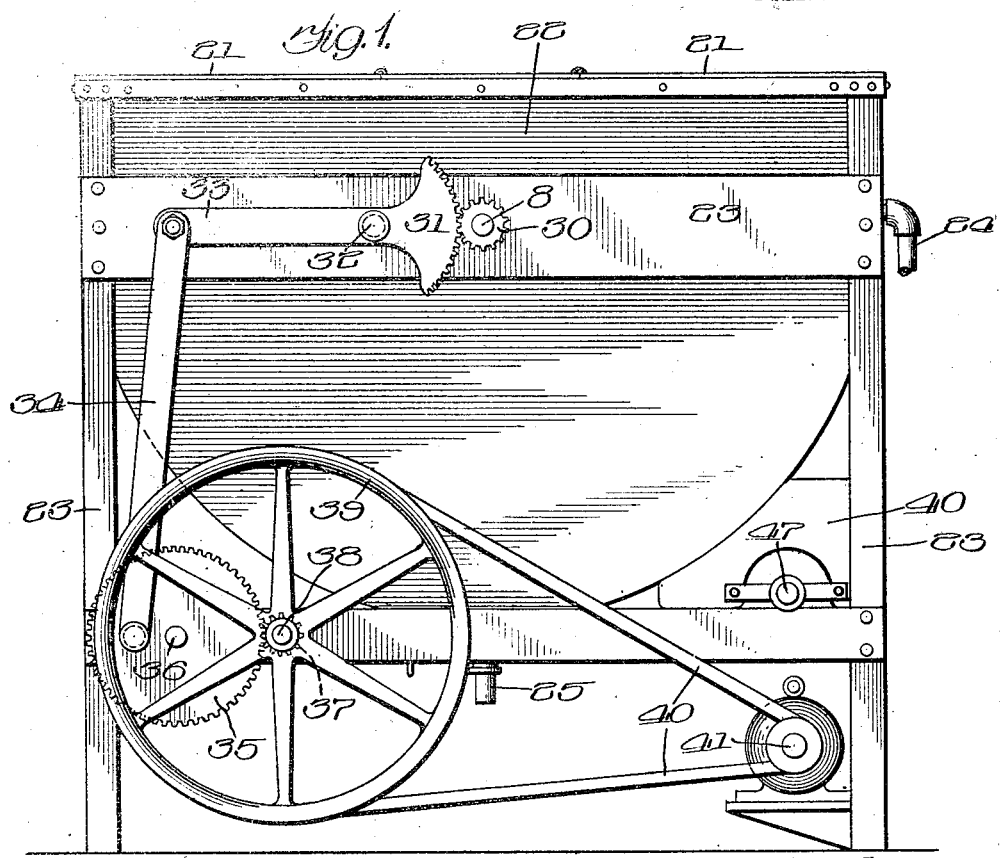
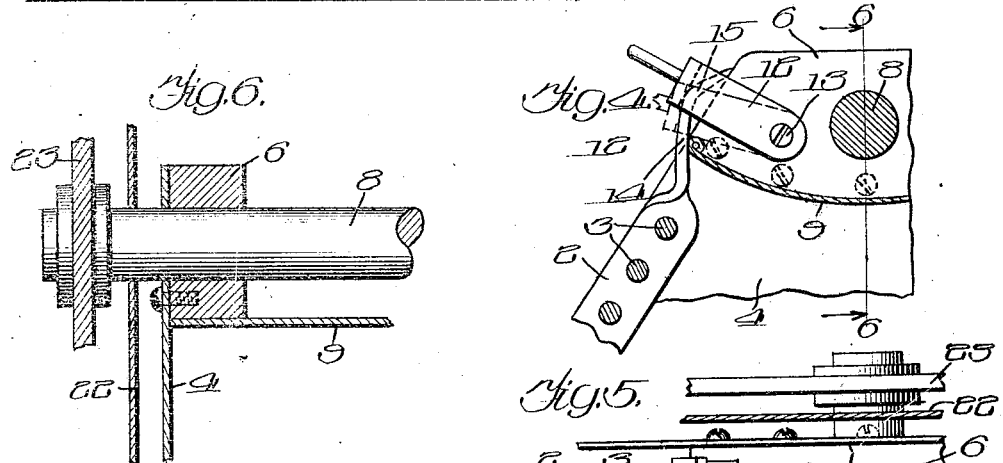

UNITED STATES PATENT OFFICE.

ARTHUR C. McWILLIAMS, OF CHICAGO, ILLINOIS.

WASHING-MACHINE.

1,121,275.  Specification of Letters Patent.  Patented Dec. 15, 1914.

Application filed May 27, 1912. Serial No. 700,039.

*To all whom it may concern:*

Be it known that I, ARTHUR C. McWILLIAMS, a citizen of the United States, residing at Chicago, in the county of Cook and State of Illinois, have invented a certain new and useful Improvement in Washing-Machines, of which the following is a specification.

My invention relates to washing machines, and the object of the invention is to provide means for forcibly passing the clothes through the water and agitating them in such manner that the dirt will be thoroughly expunged from the fabric.

I obtain my object by the mechanism illustrated in the accompanying drawings, in which Figure 1 is a side elevation of the complete machine. Fig. 2 is a longitudinal sectional elevation thereof. Fig. 3 is a plan section on the line 3—3, Fig. 2. Figs. 4 and 5 show in sectional elevation and sectional plan the fastening means for the cage door. Fig. 6 is a detail section on the line 6—6, Fig. 4.

Similar numerals denote like parts throughout the different views.

The receptacle or cage for containing the clothes has a floor 1 which is cylindrical and preferably formed of imperforate sheet metal. The sides of the cage constitute doors and are hinged to the side edges of the floor 1. These doors consist of side bars 2, supporting a number of parallel cross bars 3. Said cross bars are far enough apart to permit water to freely pass between them, but are close enough together to retain the clothes. The ends 4 of the cage consist preferably of imperforate sheet metal conforming to the end outline of the cage. They are broad at the bottom and narrow at the top and resemble approximately a sector of a circle. Blocks 6 are secured to the apices of the ends 4 on the inside for reinforcing them, as best shown in Figs. 4, 5 and 6. These blocks form bearings for supporting the cage upon the main shaft 8. The blocks are rigidly fastened to the shaft so that when the shaft is rocked the cage will vibrate in the manner hereinafter referred to. A top 9 is arranged horizontally beneath shaft 8 and is secured to the blocks 6. It forms a top closure for the cage and also a fastening means for the upper end of the partition bars 10. These bars are arranged approximately vertically at about the center of the cage and are fastened at their lower ends to the floor 1. They are arranged in echelon so that when they move toward the clothes, one bar will strike in advance of its neighbors. This zig zag or staggered arrangement is clearly shown by the small dotted circles at the center of Fig. 3.

A fastening means for the upper end of the cage door, superior in its simplicity and efficiency, is shown in detail in Figs. 4 and 5. This consists of a latch 12 pivoted upon the screw 13 screwing into block 6 and adapted to engage the resilient tongue 14, formed at the upper end of the door. A ridge 15 is formed in the tongue and the latch is adapted to spring over it so as to firmly hold the door in closed position and at the same time prevent the latch from becoming dislodged during the action of the machine.

The cage and associated parts, above mentioned, are mounted within a water tight vessel 20 which is cylindrical at the bottom and closed at the top by a cover 21. Shaft 8 is suitably journaled in the ends 22 of said vessel and the vessel is supported upon any suitable frame work 23. Water is introduced through any suitable inlet 24 and may be removed through a bottom drain pipe 25, provided with a valve 26.

Shaft 8 is rocked or oscillated by a pinion 30 rigidly secured thereto and meshing with a toothed segment 31 fulcrumed upon a stationary pivot 32. Said segment is operated by an arm 33, articulately connected to a link or connecting rod 34, eccentrically connected to a driving disk 35. Disk 35 is supported upon the stationary axle 36 and is provided with teeth meshing with a pinion 37 mounted on a shaft 38 and driven by a band wheel 39 connected by a belt 40 or otherwise to a motor 41.

It is desirable to equip the apparatus with a water heater consisting of a vessel 44 supported in the frame work of the machine and connected by passages 45 to the inside of the receptacle 20. An arch 46 is formed in the bottom of said heater and a gas burner 47 is located beneath the arch, the flow of gas through the burner being controlled by the valve 48, shown in Fig. 3. It will be understood, however, that any suitable water heater may be substituted and that the heater may or may not be a component part of the apparatus.

In operation, the cover 21 is removed and the cage doors 2, 3, thrown open, as indicated by the dotted lines in Fig. 2. The clothes are then introduced into the cage, one half on each side of the partition bars 10. The cage doors are then closed and latched and the water is introduced into the machine and the cover 21 replaced. The motor 41 is then started, which causes the eccentric 35 to rotate and this in turn causes the segment 31 to vibrate up and down and produce in the pinion 30 and shaft 8 a rotary movement, first in one direction and then in the other. It is preferable that the gearing be so proportioned that the cage will swing through an arc of about 180 degrees. This quantity of vibration of the cage may, however, be considerably varied without departing from the spirit of the invention. The vibration of the cage forward and back with the clothes in it causes the bars 3 and 10 to first beat the clothes and then force them through the water, for it will be understood that the clothes do not completely fill the compartments of the receptacle and hence are thrown from one side to the other during the operation of the machine. The cage bars do not offer much resistance to the water and hence can pass freely through it and impart a sharp stroke to the clothes as they come into contact with them. The beating action of the cage is especially enhanced by the staggered arrangement of the partition bars 10. As these bars approach the clothes, the bar in front strikes them and immediately thereafter another bar strikes them and so on, the agitation being consequently very thorough. After the washing action is complete, the cover 21 is removed, the doors 2, 3, opened and the clothes removed in the ordinary manner.

Having thus described my invention, what I claim as new and desire to secure by Letters Patent, is:—

A washing machine embracing a stationary water tight vessel having a cylindrical bottom, a vibratory receptacle mounted within said vessel and adapted to swing upon an axis coincident with the center of said vessel, and a partition arranged substantially at the center of said receptacle and dividing said receptacle into two approximately equal compartments, said partition consisting of vertical bars in zig-zag arrangement whereby the clothes are contacted successively by the bars at each half cycle of operation.

In witness whereof, I have hereunto subscribed my name in the presence of two witnesses.

ARTHUR C. McWILLIAMS.

Witnesses:
 HOWARD M. COX,
 MARGARET D. ROBB.